United States Patent
Usuki et al.

(10) Patent No.: US 8,714,832 B2
(45) Date of Patent: May 6, 2014

(54) CONICAL ROLLER CAGE

(75) Inventors: Isao Usuki, Yamatotakada (JP); Hiroshi Ueno, Tondabayashi (JP); Hirosato Nakanishi, Toyohashi (JP); Masashi Sakaguchi, Yao (JP); Kazuki Hamada, Kashiwara (JP); Hironori Hiraoka, Yao (JP)

(73) Assignee: JTEKT Corporation, Osaka-shi (JP)

(*) Notice: Subject to any disclaimer, the term of this patent is extended or adjusted under 35 U.S.C. 154(b) by 0 days.

(21) Appl. No.: 13/578,928

(22) PCT Filed: Feb. 22, 2011

(86) PCT No.: PCT/JP2011/053793
§ 371 (c)(1),
(2), (4) Date: Aug. 14, 2012

(87) PCT Pub. No.: WO2011/105352
PCT Pub. Date: Sep. 1, 2011

(65) Prior Publication Data
US 2012/0321237 A1 Dec. 20, 2012

(30) Foreign Application Priority Data
Feb. 24, 2010 (JP) .................................. 2010-038759
Apr. 1, 2010 (JP) .................................. 2010-085097

(51) Int. Cl.
*F16C 33/48* (2006.01)
(52) U.S. Cl.
USPC .......................................................... 384/572
(58) Field of Classification Search
USPC ........................... 384/470, 572, 576, 621, 623
See application file for complete search history.

(56) References Cited

U.S. PATENT DOCUMENTS

| | | | | |
|---|---|---|---|---|
| 3,628,839 A | * | 12/1971 | Vannest | 384/470 |
| 4,472,006 A | * | 9/1984 | Goransson et al. | 384/576 |
| 6,135,643 A | | 10/2000 | Hattori et al. | |
| 7,175,351 B2 | * | 2/2007 | Ono et al. | 384/571 |

FOREIGN PATENT DOCUMENTS

| | | |
|---|---|---|
| DE | 42 06 861 A1 | 9/1992 |
| GB | 1 562 140 | 3/1980 |
| JP | A-52-44358 | 4/1977 |

(Continued)

OTHER PUBLICATIONS

International Search Report issued in International Patent Application No. PCT/JP2011/053793 dated May 17, 2011 (with translation).

(Continued)

*Primary Examiner* — James Pilkington
(74) *Attorney, Agent, or Firm* — Oliff PLC

(57) ABSTRACT

A conical roller cage that implements a conical roller bearing that is able to suppress torque and that is able to smoothly supply lubricant to a raceway surface includes: a small-diameter annular portion, a large-diameter annular portion having a bore diameter larger than a bore diameter of the small-diameter annular portion, pillar portions that couple the small-diameter annular portion to the large-diameter annular portion and that are located at intervals from each other in a circumferential direction, roller partition wall portions each radially extending from a radial end face of a corresponding one of the pillar portions, and canopy portions each protruding from a radial end portion of a corresponding one the roller partition wall portions, at an opposite side to a side of the pillar portion, toward both sides in the circumferential direction.

4 Claims, 2 Drawing Sheets

(56) References Cited

FOREIGN PATENT DOCUMENTS

| JP | A-9-177796 | 7/1997 |
|---|---|---|
| JP | A-11-44322 | 2/1999 |
| JP | A-2001-221236 | 8/2001 |
| JP | A-2007-32679 | 2/2007 |
| JP | A-2008-240898 | 10/2008 |
| JP | A-2008-240901 | 10/2008 |
| JP | A-2008-309312 | 12/2008 |

OTHER PUBLICATIONS

European Search Report issued in European Patent Application No. 11747313.2 on Apr. 11, 2013.

* cited by examiner

CONICAL ROLLER CAGE

TECHNICAL FIELD

The invention relates to a conical roller cage that retains conical rollers.

BACKGROUND ART

Conventionally, a conical roller bearing is described in Patent Document 1. In addition, when a conical roller bearing is lubricated by grease, the conical roller bearing is lubricated by churning grease or lubricated by channeling grease depending on an application.

Here, oil content is more smoothly supplied to a raceway surface in the churning grease than in the channeling grease, while there is a problem that agitation resistance of grease increases and heat generation due to the agitation resistance also increases. On the other hand, it is advantageous in torque reduction because the channeling grease has small agitation resistance, while grease inside a bearing is splashed to the outside of the raceway at an initial stage of driving, so there is a problem that oil content supplied to the raceway surface reduces and it is disadvantageous in bearing life.

PRIOR ART DOCUMENT

Patent Document

Patent Document 1: Japanese Patent Application Publication No. 9-177796 (FIG. 1)

DISCLOSURE OF THE INVENTION

Problem to be Solved by the Invention

It is an object of the invention to provide a conical roller cage that implements a conical roller bearing that is able to suppress torque and that is able to smoothly supply lubricant to a raceway surface.

Means for Solving the Problem

A conical roller cage according to an aspect of the invention includes: a small-diameter annular portion; a large-diameter annular portion that has a bore diameter larger than a bore diameter of the small-diameter annular portion; a plurality of pillar portions that couple the small-diameter annular portion to the large-diameter annular portion and that are located at intervals from each other in a circumferential direction; a roller partition wall portion that extends radially from a radial end face of a corresponding one of the pillar portions; and a canopy portion that protrudes from a radial end portion of each roller partition wall portion, at an opposite side to a side of the pillar portion, toward both sides in the circumferential direction. A conical roller bearing that is assembled with the conical roller cage is able to suppress torque and is able to smoothly supply lubricant to a raceway surface.

MODES FOR CARRYING OUT THE INVENTION

Hereinafter, an embodiment of the invention will be described in more details with reference to the drawings.

Figure 1:
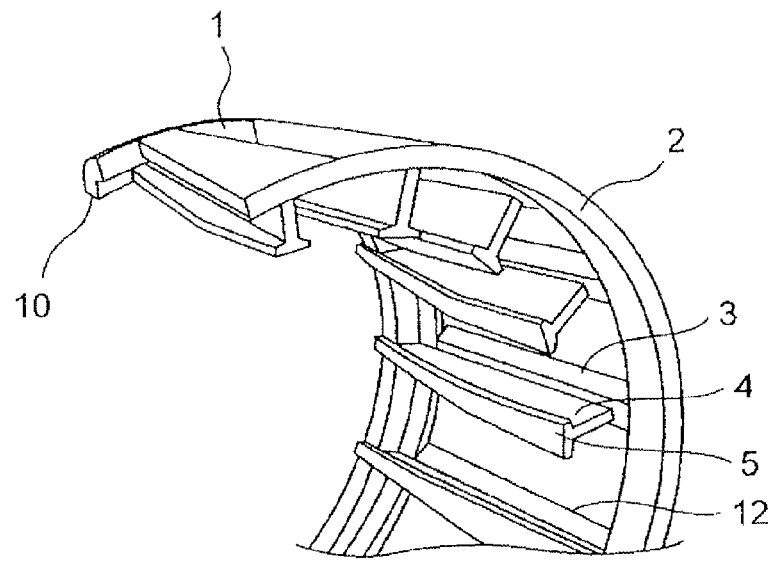
FIG. 1 is a perspective view of part of a conical roller cage according to one embodiment of the invention.

FIG. 1 is a perspective view of part of a conical roller cage according to one embodiment of the invention.

The conical roller cage is made of resin, and is manufactured by injection molding, or the like. The conical roller cage includes a small-diameter annular portion 1, a large-diameter annular portion 2, a plurality of pillar portions 3, a plurality of roller partition wall portions 4 and a plurality of canopy portions 5.

The bore diameter of the small-diameter annular portion 1 is smaller than the bore diameter of the large-diameter annular portion 2. The small-diameter annular portion 1 has a bent extending portion 10. The bent extending portion 10 is present at the axially outward end portion of the small-diameter annular portion 1. The bent extending portion 10 bends radially inward and then extends radially inward.

The large-diameter annular portion 2 is axially spaced apart from the small-diameter annular portion 1. The central axis of the large-diameter annular portion 2 substantially coincides with the central axis of the small-diameter annular portion 1.

Each of the pillar portions 3 couples the small-diameter annular portion 1 to the large-diameter annular portion 2. The plurality of pillar portions 3 are arranged at substantially equal intervals from each other in the circumferential direction of the small-diameter annular portion 1. A pocket 12 that accommodates a conical roller (not shown) is formed between any adjacent two of the pillar portions 3 in the circumferential direction.

The number of the roller partition wall portions 4 is equal to the number of the pillar portions 3. The axial length of each roller partition wall portion 4 is substantially equal to the axial length of each pillar portion 3. In addition, the circumferential width of each roller partition wall portion 4 is smaller than the circumferential width of each pillar portion 3. Each roller partition wall portion 4 is present only on a radially one side of a corresponding one of the pillar portions 3. Each roller partition wall portion 4 extends radially inward from a radially inward end face of a corresponding one of the pillar portions 3. Each roller partition wall portion 4 is connected to the bent extending portion 10 of the small-diameter annular portion 1.

The number of the canopy portions 5 is equal to the number of the roller partition wall portions 4. The axial length of each canopy portion 5 is substantially equal to the axial length of each roller partition wall portion 4. Each canopy portion 5 is connected to an end portion of a corresponding one of the roller partition wall portions 4, at an opposite side to a side of the pillar portion 3. Each canopy portion 5 protrudes in a canopy shape from a radial end portion of a corresponding one of the roller partition wall portions 4, at an opposite side to a side of the pillar portion 3, toward both sides in the circumferential direction. Each canopy portion 5 is connected to the bent extending portion 10 of the small-diameter annular portion 1.

The conical roller cage is able to constitute a conical roller assembly in a state where the plurality of conical rollers are respectively accommodated in the plurality of pockets 12.

Figure 2:
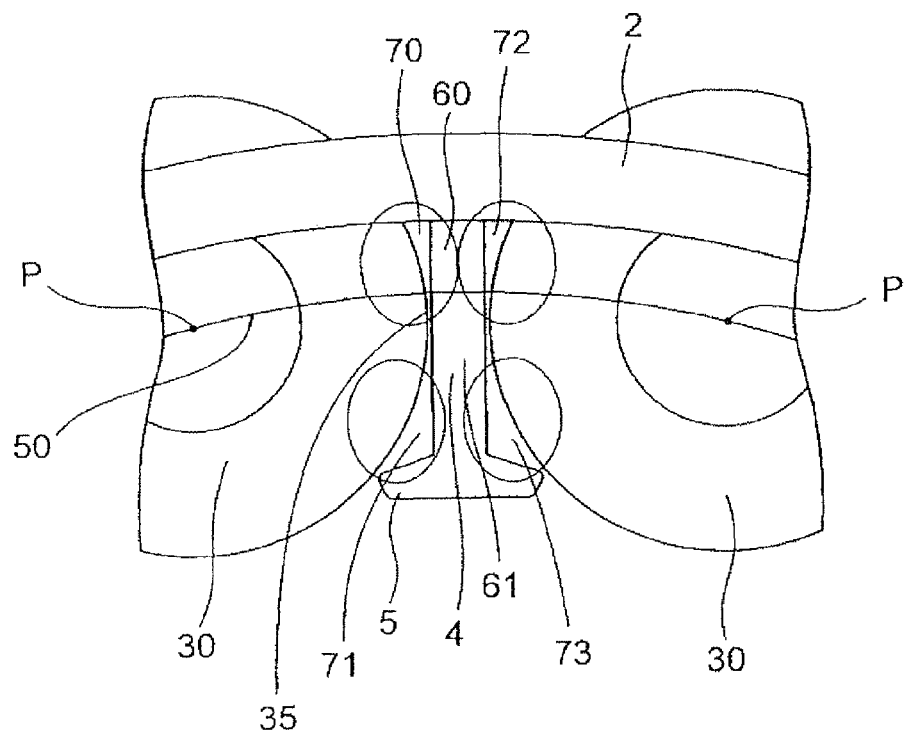
FIG. 2 is a view that shows part of a cage assembly formed of the conical roller cage shown in FIG. 1 and a plurality of conical rollers.

FIG. 2 is a view of part of the conical roller assembly when viewed from an axially outward of the large-diameter annular portion 2.

In the conical roller assembly, the conical rollers 30 are not allowed to contact the roller partition wall portions 4, and are also not allowed to contact the canopy portions 5. This is implemented by limiting (restricting) movement of the conical rollers 30 with the pillar portions 3 (see FIG. 1). By so doing, rolling of the conical rollers 30 is not braked by the roller partition wall portions 4 or the canopy portions 5. Thus, smooth rolling of the conical rollers 30 is ensured.

In FIG. 2, the reference numeral 50 denotes an imaginary conical annular surface that is defined as a trajectory along which central axes P of the conical rollers pass. As shown in FIG. 2, each roller partition wall portion 4 covers at least part of outer portions of the conical rollers 30, located radially outward of the imaginary conical annular surface 50, and cover at least part of inner portions of the conical rollers 30, located radially inward of the imaginary conical annular surface 50. In short, the partition wall portions 4 each have an outer portion 60 located radially outward of the central axes P of the corresponding conical rollers 30 and an inner portion 61 located radially inward of the central axes P in a state where the conical rollers 30 are respectively accommodated in the pockets 12.

In this way, a radial location 35 at which each roller partition wall portion 4, at which a circumferential distance between the corresponding conical roller 30 and the roller partition wall portion 4 is minimum, is intentionally formed near the imaginary conical annular surface 50, and lubricant reservoirs 70 and 71 or 72 and 73 are intentionally formed on both radial sides of that location 35. Specifically, it is possible to accumulate and feed lubricant by the rotation of each conical roller 30 to the lubricant reservoirs (hereinafter, referred to as pillar portion-side lubricant reservoirs) 70 and 72, defined by the conical rollers 30 and the roller partition wall portion 4 on a radial side of the location 35, adjacent to the pillar portion 3. It is possible to accumulate and feed lubricant by the rotation of each conical roller 30 to the lubricant reservoirs (hereinafter, referred to as canopy portion-side lubricant reservoirs) 71 and 73, defined by the roller partition wall portion 4, the canopy portion 5 and the conical rollers 30 on a radial side of the location 35, adjacent to the canopy portion 5. Note that, in this embodiment, a circumferential distance between each of the locations 35 of each roller partition wall portion 4 and a corresponding one of the conical rollers 30 is about 0.2 mm.

Figure 3:
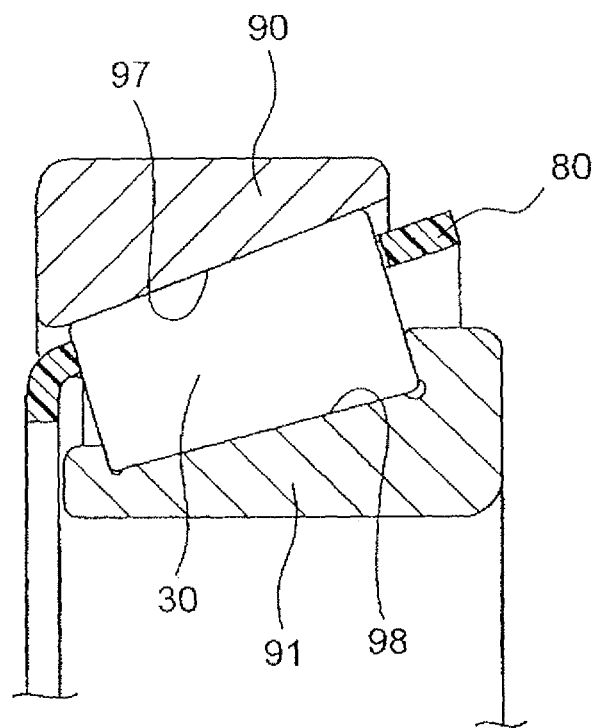
FIG. 3 is a schematic axial sectional view of a conical roller bearing that includes the conical roller cage shown in FIG. 1 according to the embodiment.

FIG. 3 is a schematic axial sectional view of a conical roller bearing that includes the conical roller cage 80 according to the above embodiment.

The conical roller bearing includes an outer ring 90, an inner ring 91, the plurality of conical rollers 30 and the conical roller cage 80. The outer ring 90 has an inner peripheral conical raceway surface 97, and the inner ring 91 has an outer peripheral conical raceway surface 98. The plurality of conical rollers 30 are arranged at equal intervals in the circumferential direction between the inner peripheral conical raceway surface 97 of the outer ring 90 and the outer peripheral conical raceway surface 98 of the inner ring 91 so as to be retained by the conical roller cage 80. The conical roller bearing is able to keep lubricant in the lubricant reservoirs 70, 71, 72 and 73 of the conical roller cage 80, adjacent to the conical raceway surfaces 97 and 98, so it is possible to smoothly supply lubricant to the conical raceway surfaces 97 and 98. Thus, it is possible to extend bearing life.

With the conical roller cage 80 according to the above embodiment, after assembling the conical roller bearing, the lubricant reservoirs 71 and 73 are defined by the conical rollers 30, the roller partition wall portions 4 and the canopy portions 5. In addition, it is possible to feed lubricant present on the rolling surfaces of the conical rollers 30 to the lubricant reservoirs 71 and 73 owing to the rotation of the conical rollers 30. Thus, it is possible to keep lubricant in the lubricant reservoirs 71 and 73 and to keep lubricant at portions closer to the conical raceway surfaces 97 and 98, so it is possible to smoothly supply lubricant to the conical raceway surfaces 97 and 98 and to improve bearing life. Thus, for example, when channeling grease is used as lubricant, grease is hard to be splashed outward of the conical raceway surfaces 97 and 98, so it is possible to reduce torque and to reliably supply grease to the conical raceway surfaces 97 and 98.

With the conical roller cage 80 according to the above embodiment, the radial locations 35 of each roller partition wall portion 4, at which a distance between the roller partition wall portion 4 and the corresponding conical roller 30 is minimum, are present at radially center portions (that indicate portions other than both radial end portions) of the roller partition wall portion 4, so the lubricant reservoirs 70, 71, 72 and 73 are formed on both radial sides of the locations 35 of each roller partition wall portion 4. Specifically, the four lubricant reservoirs 70, 71, 72 and 73 are formed near each roller partition wall portion 4, so a large number of the lubricant reservoirs 70, 71, 72 and 73 are formed near the conical raceway surfaces 97 and 98. By so doing, it is possible to further smoothly supply lubricant to the conical raceway surfaces 97 and 98 and to further improve bearing life.

With the conical roller cage 80 according to the above embodiment, each roller partition wall portion 4 extends radially from a radially inward end face of a corresponding one of the pillar portions 3, so assemblability of the conical rollers 30 to the conical roller cage 80 is excellent. In addition, retention force for retaining lubricant in the lubricant reservoirs 70, 71, 72 and 73 is excellent.

With the conical roller cage 80 according to the above embodiment, the small-diameter annular portion 1 has the bent extending portion 10 that bends radially and then extends, and the roller partition wall portions 4 and the canopy portions 5 each are connected to the bent extending portion 10. Thus, the lubricant reservoirs 70, 71, 72 and 73 defined by the roller partition wall portions 4, the canopy portions 5 and the conical rollers 30 are further closed by the bent extending portion 10 at one axial side. Thus, it is possible to especially improve the sealing performance of the lubricant reservoirs 70, 71, 72 and 73 and to especially improve the lubricant retention performance of the lubricant reservoirs 70, 71, 72 and 73.

With the conical roller cage 80 according to the above embodiment, because each roller partition wall portion 4 is present only on a radially one side of a corresponding one of the pillar portions, assemblability of the conical rollers 30 to the conical roller cage 80 is excellent. If each roller partition wall portion is present on radially both sides of a corresponding one of the pillar portions, it is difficult to assemble conical rollers to a conical roller cage.

Note that, in the conical roller cage 80 according to the above embodiment, the roller partition wall portions 4 and the canopy portions 5 are located radially inward of the pillar portions 3; instead, in this invention, the roller partition wall portions and the canopy portions may be located radially outward of the pillar portions.

In the conical roller cage 80 according to the embodiment, the roller partition wall portions 4 and the canopy portions 5 each are present only on one radial side of a corresponding one of the pillar portions 3; instead, in this invention, the roller partition wall portions and the canopy portions each may be present on both radial sides of a corresponding one of the pillar portions.

In the conical roller cage 80 according to the embodiment, the roller partition wall portions 4 and the canopy portions 5 are connected to the bent extending portion 10 of the small-diameter annular portion 1. In this invention, the roller partition wall portions and the canopy portions may be spaced apart from the bent extending portion of the small-diameter annular portion. One of the roller partition wall portions and the canopy portions may be spaced apart from the bent extending portion of the small-diameter annular portion, and the other one of the roller partition wall portions and the canopy portions may be connected to the bent extending portion of the small-diameter annular portion. For example, the bent extending portion 10 may be shaped so as to extend to radially middle portions of the roller partition wall portions and not to reach the canopy portions. In this case as well, one axial sides of the lubricant reservoirs 70 and 72 are closed by the bent extending portion, so it is possible to improve lubricant retention performance.

In the conical roller cage 80 according to the embodiment, a circumferential distance between each of the locations 35 of each roller partition wall portion 4 and a corresponding one of the conical rollers 30 is about 0.2 mm. In this invention, in the conical roller assembly, a minimum circumferential distance between each conical roller and a corresponding one of the roller partition wall portions may be smaller than about 0.2 mm and, in addition, may be larger than about 0.2 mm.

In addition, in the conical roller cage 80 according to the embodiment, both the roller partition wall portions 4 and the canopy portions 5 are spaced apart from the large-diameter annular portion 2. In this invention, it is also applicable that a bent extending portion that bends radially and then extends is formed in the large-diameter annular portion and at least one of the roller partition wall portions and the canopy portions are connected to that bent extending portion.

In the conical roller cage 80 according to the embodiment, the bent extending portion 10 of the small-diameter annular portion 1 is located radially inward of the pockets 12 and is connected to the roller partition wall portions 4 and the canopy portions 5 that are located radially inward of the pillar portions 3. In this invention, it is also applicable that the bent extending portion of the small-diameter annular portion is located radially outward of the pockets and is connected to at least one of the roller partition wall portions and the canopy portions, located radially outward of the pillar portions, on a radially outward of the pockets.

In the conical roller cage 80 according to the embodiment, the number of the roller partition wall portions 4 is equal to the number of the pillar portions 3, and the roller partition wall portions 4 are respectively connected to the pillar portions 3; instead, in this invention, it is also applicable that the number of the roller partition wall portions is smaller than the number of the pillar portions and the roller partition wall portions are connected to part of the plurality of pillar portions only. For example, when there are even numbers of pillar portions, the pillar portion to which the roller partition wall portion is connected and the pillar portion to which the roller partition wall portion is not connected may alternately appear in the circumferential direction.

In the conical roller cage 80 according to the embodiment, the conical rollers 30 are not allowed to contact both the roller partition wall portions 4 and the canopy portions 5.

Instead, in this invention, it is applicable that the conical rollers are stably retained by the roller partition wall portions and the canopy portions to constitute a stable conical roller assembly only with the conical roller cage and the plurality of conical rollers.

By so doing, the following problem may be solved, and special operational effects are obtained.

That is, generally, a rib portion is generally formed at a small end face side of an inner ring of a conical roller bearing as in the case of a large end face side. Here, a large end face-side large rib portion serves as a thrust pad for the conical rollers, whereas a small end face-side small rib portion is mainly intended to prevent a spread of the conical rollers at the time of disassembling the bearing, so the small rib portion does not significantly influence bearing performance (strength and life). That is, the small rib portion has such a disadvantage that an effect per increase in cost due to machining (cost-effectiveness) is small as compared with the large rib portion. In addition, at the time of supplying a bearing to a customer as well, a state where an inner ring and an outer ring are set is a base.

Here, according to the above alternative embodiment, as in the case cage and roller, a stable conical roller assembly may be formed of only the conical roller cage and the plurality of conical rollers, so a spread of the conical rollers does not occur at the time of disassembling the bearing. Thus, according to this alternative embodiment, it is not necessary to manufacture the small rib portion of the inner ring, so the structure of the inner ring is simple, and it is possible to reduce the cost of the bearing. In addition, it is possible to prepare portions corresponding to the inner and outer rings (housings) by a customer, and to supply only the conical roller assembly to the customer without the inner and outer rings. Note that, in this alternative embodiment as well, it is possible to retain lubricant near the conical raceway surfaces, so it is, of course, possible to smoothly supply lubricant to the conical raceway surfaces and to extend bearing life.

According to the invention, after assembling the conical roller bearing, the lubricant reservoirs may be defined by the conical rollers, the roller partition wall portions and the canopy portions. It is possible to feed lubricant present on the rolling surfaces of the conical rollers to the lubricant reservoirs owing to the rotation of the conical rollers. Thus, it is possible to retain lubricant in the lubricant reservoirs and to retain lubricant at portions closer to the conical raceway surfaces, so it is possible to smoothly supply lubricant to the conical raceway surfaces and to improve bearing life. Thus, for example, when channeling grease is used as lubricant, grease is hard to be splashed outward of the raceway, so it is possible to reduce torque and to reliably supply grease to the conical raceway surfaces.

In one embodiment, each partition wall portion has an outer portion located radially outward of the central axes of the corresponding conical rollers and an inner portion located radially inward of the central axes of the corresponding conical rollers in a state where the conical rollers are respectively accommodated in the pockets each formed between any adjacent two of the pillar portions in the circumferential direction.

According to the above embodiment, the radial locations, at which a distance between each roller partition wall portion and a corresponding one of the conical rollers is minimum, are present at the radially center portions (that indicate portions other than both radial end portions) of the roller partition wall portion. Thus, lubricant reservoirs are formed on both sides of each of the radial locations at which a distance between each roller partition wall portion and a corresponding one of the conical rollers is minimum. Specifically, lubricant reservoirs (hereinafter, referred to as pillar portion-side lubricant reservoirs) are defined by the conical rollers and each roller partition wall portion on a radial side adjacent to the pillar portion with respect to the radial locations at which a distance between each roller partition wall portion and a corresponding one of the conical rollers is minimum. Then, it is possible to accumulate and feed lubricant to the pillar portion-side lubricant reservoirs owing to the rotation of the conical rollers. In addition, lubricant reservoirs (hereinafter, canopy portion-side lubricant reservoirs) are defined by each roller partition wall portion, each canopy portion and the conical rollers on a radial side adjacent to the canopy portion with respect to the radial locations at which a distance between each roller partition wall portion and a corresponding one of the conical rollers is minimum. Then, it is possible to accumulate and feed lubricant to the canopy portion-side lubricant reservoirs owing to the rotation of the conical rollers. Specifically, the four lubricant reservoirs are formed near each roller partition wall portion, so a large number of the lubricant reservoirs are formed near the conical raceway surfaces of the conical rollers. Thus, it is possible to further smoothly supply lubricant to the conical raceway surfaces and to further improve bearing life.

In one embodiment, each roller partition wall portion extends radially from a radially inward end face of a corresponding one of the pillar portions, and each canopy portion protrudes from a radially inward end portion of a corresponding one of the roller partition wall portions toward both sides in the circumferential direction.

According to the above embodiment, each roller partition wall portion extends radially from a radially inward end face of a corresponding one of the pillar portions, so assemblability of the conical rollers to the cage is excellent. Retention force for retaining lubricant in the lubricant reservoirs is excellent.

In one embodiment, the small-diameter rib portion has a bent extending portion that bends radially and then extends, and the roller partition wall portions and the canopy portions each are connected to the bent extending portion.

According to the above embodiment, the lubricant reservoirs defined by the roller partition wall portions, the canopy portions and the conical rollers are further closed by the bent extending portion at one axial side. Thus, it is possible to especially improve the sealing performance of the lubricant reservoirs and to especially improve the lubricant retention performance of the lubricant reservoirs.

With the conical roller bearing cage according to the invention, after assembling the conical roller bearing, lubricant reservoirs are defined by the conical rollers, the roller partition wall portions and the canopy portions, and, in addition, it is possible to feed lubricant present on the rolling surfaces of the conical rollers to the lubricant reservoirs owing to the rotation of the conical rollers. Thus, it is possible to retain lubricant in the lubricant reservoirs and to retain lubricant at portions closer to the conical raceway surfaces, so it is possible to smoothly supply lubricant to the conical raceway surfaces and to improve bearing life.

The invention claimed is:

1. A conical roller cage comprising:
   a small-diameter annular portion;
   a large-diameter annular portion that has a bore diameter larger than a bore diameter of the small-diameter annular portion;
   a plurality of pillar portions that couple the small-diameter annular portion to the large-diameter annular portion and that are located at intervals from each other in a circumferential direction;
   a plurality of roller partition walls that each extend radially from a radially facing surface of a corresponding pillar portion of the plurality of pillar portions, a circumferential width of each roller partition wall being smaller than a circumferential width of each pillar portion;
   a plurality of canopy portions, each canopy portion protruding from a radially facing surface of each roller partition wall opposite from the corresponding pillar portion, each canopy portion extending in both circumferential directions from a center of the canopy portion; and
   lubricant reservoirs disposed on both radial sides of a radial location, the radial location defining a position at which a circumferential distance between each roller partition wall and a corresponding conical roller of a plurality of conical rollers is at a minimum, the radial location being disposed near a trajectory along which central axes of the conical rollers pass, the reservoirs including:
      a pillar portion-side lubricant reservoir that is defined by one of the conical rollers and one of the roller partition walls, the pillar portion-side lubricant reservoir being radially offset from the radial location and adjacent to one of the pillar portions; and
      a canopy portion-side lubricant reservoir that is defined by one of the conical rollers, one of the roller partition walls, and one of the canopy portions, the canopy portion-side lubricant reservoir being radially offset from the radial location and adjacent to the one canopy portion, wherein:
   two pillar portion-side lubricant reservoirs and two canopy portion-side lubricant reservoirs are disposed adjacent to each roller partition wall portion;
   the small-diameter annular portion has a bent portion that extends radially;
   the roller partition walls and the canopy portions each are connected to the bent portion; and
   one axial side of each lubricant reservoir is closed by the bent portion.

2. The conical roller cage according to claim 1, wherein each partition wall includes
   an outer portion that, in a state where the conical rollers are respectively accommodated in pockets each formed between any adjacent two of the pillar portions in the circumferential direction, is located radially outward of central axes of the corresponding conical rollers; and
   an inner portion that is located radially inward of the central axes of the corresponding conical rollers.

3. The conical roller cage according to claim 1, wherein each roller partition wall extends radially from a radially inward facing surface of the corresponding pillar portion, and
each canopy portion protrudes from a radially inward facing surface of a corresponding roller partition wall, each canopy extending in both circumferential directions from a center of the canopy portion.

4. The conical roller cage according to claim 2, wherein each roller partition wall extends radially from a radially inward facing surface of the corresponding pillar portion, and
each canopy portion protrudes from a radially inward facing surface of a corresponding roller partition wall, each canopy extending in both circumferential directions from a center of the canopy portion.

* * * * *